June 2, 1959 C. W. MONTGOMERY ET AL 2,888,947
REGULATING VALVE
Filed Nov. 10, 1954
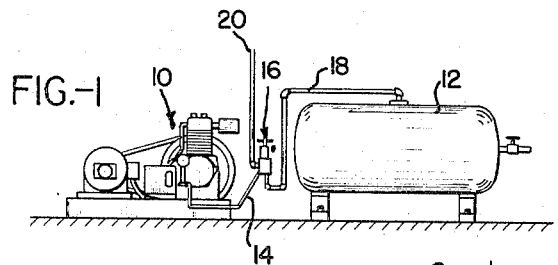
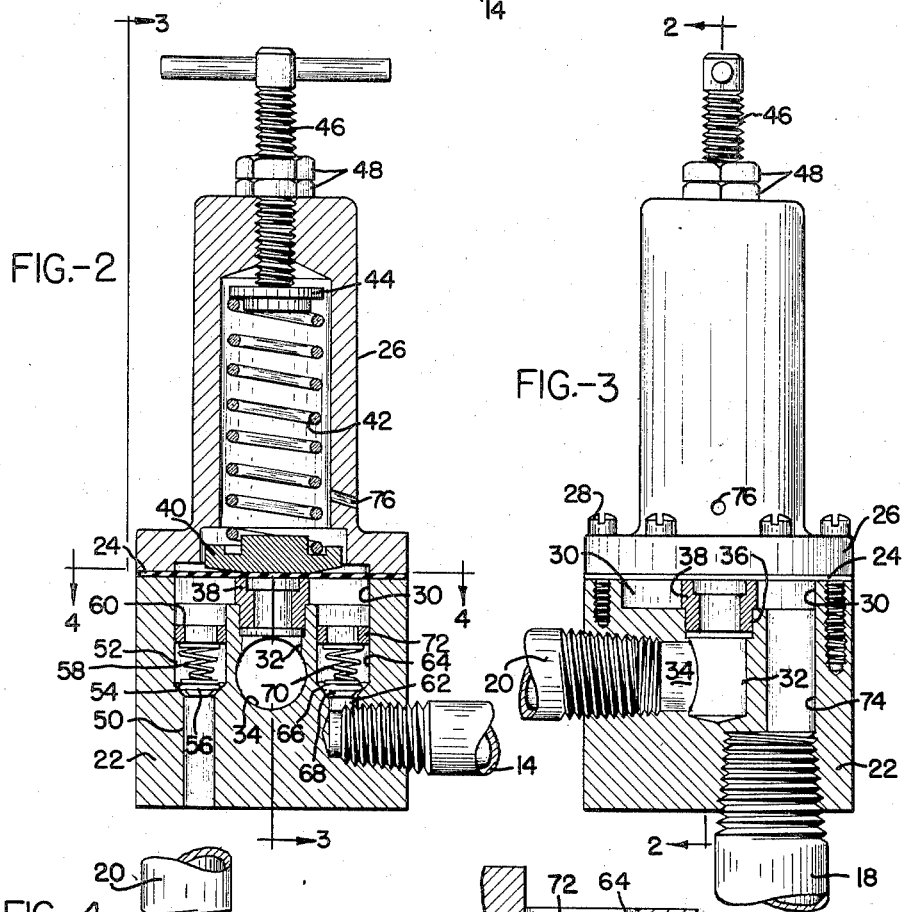
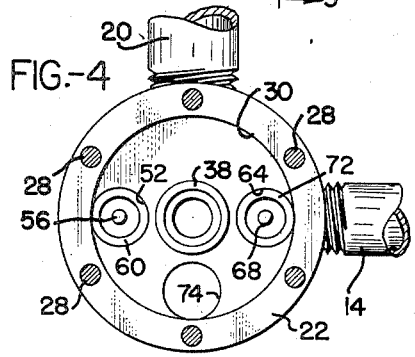
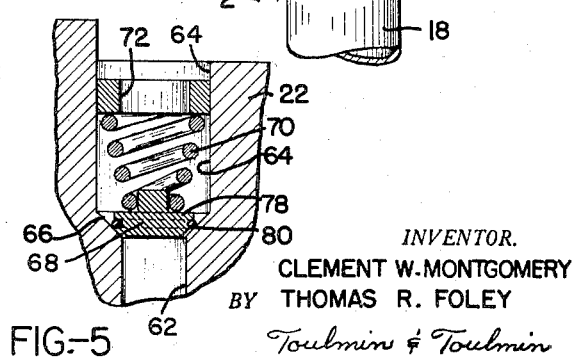
INVENTOR.
CLEMENT W. MONTGOMERY
BY THOMAS R. FOLEY
Toulmin & Toulmin
ATTORNEY United States Patent Office 2,888,947
Patented June 2, 1959

2,888,947

REGULATING VALVE

Clement W. Montgomery and Thomas R. Foley, Franklin, Ohio, assignors to The M & F Manufacturing Co., Franklin, Ohio, a corporation of Ohio Application November 10, 1954, Serial No. 467,945

1 Claim. (Cl. 137—493.8)

This invention relates to valves, particularly to a regulating or relief valve especially adapted for use in controlling or regulating the pressures of gaseous mediums.

A particular object of the present invention is the provision of a simplified valve arrangement of the nature referred to.

It is also an object of this invention to provide a relief or regulating valve characterized in being simple to manufacture and being inexpensive to produce and simple to maintain.

A further object of this invention is the provision of a valve of the nature referred to which is readily adjustable to different pressure ranges, and which has no tendency to leak under any normal condition of operation.

These and other objects and advantages of this invention will become more apparent upon reference to the following specification taken in connection with the accompanying drawings, in which:

Figures 1 is a more or less diagrammatic view showing how a valve according to the present invention can be connected into a circuit between a compressor and a receiver;

Figure 2 is a vertical section of the valve indicated by line 2—2 on Figure 3;

Figure 3 is a view, partly in section as indicated by line 3—3 on Figure 2;

Figure 4 is a plan sectional view indicated by line 4—4 on Figure 2; and

Figure 5 is a fragmentary sectional view showing the construction of one of the check valves forming a part of the valve structure of the present invention.

Referring to the drawings somewhat in more detail, Figure 1 shows a compressor 10 and a receiver tank 12 with a compressor discharge line 14 leading to a regulating valve 16 according to this invention. Regulating valve 16 has a conduit 18 leading therefrom to the receiver tank and also has a discharge conduit 20 through which excessive pressures in the system are exhausted.

Referring to Figures 2 and 3, the valve according to the present invention comprises a lower body part 22, the upper end of which is planar and on which rests a flexible diaphragm 24, preferably of rubber or rubber-like synthetic material which may or may not have a fabric imbedded therein. Resting on top of diaphragm 24 is a valve cap or spring housing 26 which is secured to the lower body part 22 as by the cap screws 28.

Reference to Figures 2 through 4 will reveal that the upper end of lower body part 22 is recessed at 30 and a central bore 32 extends downwardly from the recess part-way through body part 22 where it is intersected by transverse bore 34 to which the discharge conduit 20 is connected.

Bore 32 is preferably counterbored at its upper end as at 36 and there is press-fitted into counterbore 36 the sleeve 38 that forms a valve seat on which the diaphragm 24 normally rests, and on the opposite side of diaphragm 24 from sleeve 38 is a disc 40 which is engaged by the lower end of compression spring 42, the upper end of which engages a second disc 44 on the lower end of manually adjustable screw 46 that is threaded through the upper end of valve cap 26 and which is provided with locking nuts 48.

Also extending downwardly from recess 30, in circumferentially spaced relation about central bore 32, are several other bores. The one at the left in Figure 2, indicated at 50, opens to the atmosphere at the bottom of body part 22 of the valve. Bore 50 is counterbored at its upper end at 52 and there is a tapered seat portion 54 in the bottom of the counterbore. This tapered seat portion is availed of to provide a seat for a check valve member 56 pressed downwardly by a spring 58 which bears at its upper end beneath a ring 60 press-fitted into the upper end of counterbore 52. Bore 56 and the check valve associated therewith provide a vacuum relief arrangement for admitting air to recess 30 when the pressure therein falls below atmospheric.

To the right side of Figure 2 a second bore 62 is provided, counterbored at 64 at its upper end a tapered seat 66 being provided corresponding with tapered seat 54 previously referred to. A second check valve member 68 engages tapered seat 66 and is pressed downwardly by spring 70 that bears beneath ring 72 pressed into counterbore 64. At its lower end bore 62 is intersected by a horizontal bore that is connected with inlet conduit 14 through which pressure is supplied to the valve.

Turning now to Figure 3, it will be noted that at the right side thereof a still further bore 74 is provided extending downwardly from recess 30 and which is connected at its lower end with discharge conduit 18.

The arrangement is such that gas under pressure entering the valve body via conduit 14 will pass check valve 68 and enter recess 30, whence it will pass through bore 74 to conduit 18 until the pressure on the gas reaches that amount which will urge diaphragm 24 upwardly, at which time excessive pressures will be discharged through sleeve 38, bore 32, bore 34, and discharge conduit 20 to the atmosphere.

The valve cap 26 is preferably vented at 76 thereby to prevent pressure from accumulating therein and interfering with the operation of the diaphragm 24.

Each of the check valve members 56 and 68, as will be seen in Figure 5, wherein member 68 is shown at enlarged scale, comprises a disc-like member 78 which is annularly grooved to receive an annular rubber-like O ring 80 which engages the tapered seat associated with the check valve. This construction for the check valve is simple and inexpensive, but provides a substantially perfect seal of the check valve member against its tapered seat at all times.

It will be apparent that the valve, according to this invention, can readily be serviced at any time, and that all parts thereof subject to corrosion and wear, with the exception of the tapered check valve seats, can readily be removed and repaired or replaced, and the check valve seats themselves can readily be resurfaced by a simple beveled facing tool.

The valve is simple to manufacture and can readily be constructed of any material desired in order to adapt it to particular conditions where corrosive gases, or gases containing corrosive fluids, might be passed therethrough.

It will be understood that this invention is susceptible to modification in order to adapt it to different usages and conditions and, accordingly, it is desired to comprehend such modifications within this invention as may fall within the scope of the appended claim.

We claim:

In a valve of the nature referred to; a block forming the valve body having one planar side, a cylindrical recess in said one side, a flat flexible diaphragm on said planar side closing said recess, inlet and outlet passages extending axially into the valve body from the bottom of said recess at circumferentially spaced points, an exhaust passage extending axially into said body in the center of said recess, a sleeve seated on the bottom of said recess and detachably fitted into the end of said exhaust passage to engage the diaphragm to form a seat, a cap secured to the body clamping said diaphragm in place, a spring in the cap pressing said diaphragm against the end of said sleeve, a vacuum relief passage extending axially into said valve body from the bottom of the recess, each of said inlet and vacuum relief passages being formed with an integral tapered seat facing toward said recess, a check valve member in each of said inlet and vacuum relief passages, and a spring attached to each valve member so as to support the valve members against tilting in the passages and urging the valve members toward their seats, said valve member comprising resilient rings to engage said seats.

References Cited in the file of this patent

UNITED STATES PATENTS

| | | |
|---|---|---|
| 1,871,535 | Lattner | Aug. 16, 1932 |
| 1,963,684 | Shimer | June 19, 1934 |
| 2,067,229 | Birch | Jan. 12, 1937 |
| 2,079,647 | Abegg | May 11, 1937 |
| 2,210,555 | Podolsky | Aug. 6, 1940 |
| 2,417,494 | Hoof | Mar. 18, 1947 |
| 2,490,511 | Courtot | Dec. 6, 1949 |
| 2,675,021 | Allin | Apr. 13, 1954 |
| 2,771,093 | Wilson | Nov. 20, 1956 |

FOREIGN PATENTS

| | | |
|---|---|---|
| 424,918 | Italy | Sept. 3, 1947 |
| 454,067 | Canada | Jan. 18, 1949 |
| 675,138 | Great Britain | July 2, 1952 |
| 149,213 | Australia | Nov. 27, 1952 |
| 82,424 | Norway | Sept. 14, 1953 |